United States Patent [19]

Rubin et al.

[11] Patent Number: 4,840,315

[45] Date of Patent: Jun. 20, 1989

[54] METHOD AND INSTALLATION FOR A CONTINUOUS PRESSURE COMMUNUTION OF BRITTLE GRINDING STOCK.

[75] Inventors: Gerhard Rubin, Cologne; Hugo Bleckmann, Bonn, both of Fed. Rep. of Germany

[73] Assignee: Klockner-Humboldt-Deutz Aktiengesellschaft, Fed. Rep. of Germany

[21] Appl. No.: 204,256

[22] Filed: Jun. 9, 1988

[30] Foreign Application Priority Data

Jun. 10, 1987 [DE] Fed. Rep. of Germany ....... 3719251

[51] Int. Cl.[4] .................................................. B02C 4/00
[52] U.S. Cl. ........................................ 241/24; 241/29; 241/80; 241/152 A; 241/159
[58] Field of Search ................. 241/29, 152 A, 24, 79, 241/80, 97, 159, 76, 78

[56] References Cited

U.S. PATENT DOCUMENTS

| | | | |
|---|---|---|---|
| 4,703,897 | 11/1987 | Beisner et al. | 241/29 X |
| 4,726,531 | 2/1988 | Strasser | 241/29 X |
| 4,728,044 | 3/1988 | Duill et al. | 241/29 X |

*Primary Examiner*—Mark Rosenbaum

[57] ABSTRACT

A method and apparatus for grinding brittle stock such as cement clinker to form finished cement, passing the grinding stock through a first roller press having pressure and nip capabilities to do product bed comminution which is unique in self particle destruction causing incipient cracks in the inside of the product particles which are delivered from the press in agglomerations or scabs, the agglomerated scabs are delivered to a second roller press of larger capacity, which also does product bed comminution, de-agglomerating the scabs after the second roller press, classifying the de-agglomerated product and recirculating the coarse fraction back to the second roller press and possibly also to the intake of the first roller press.

17 Claims, 1 Drawing Sheet

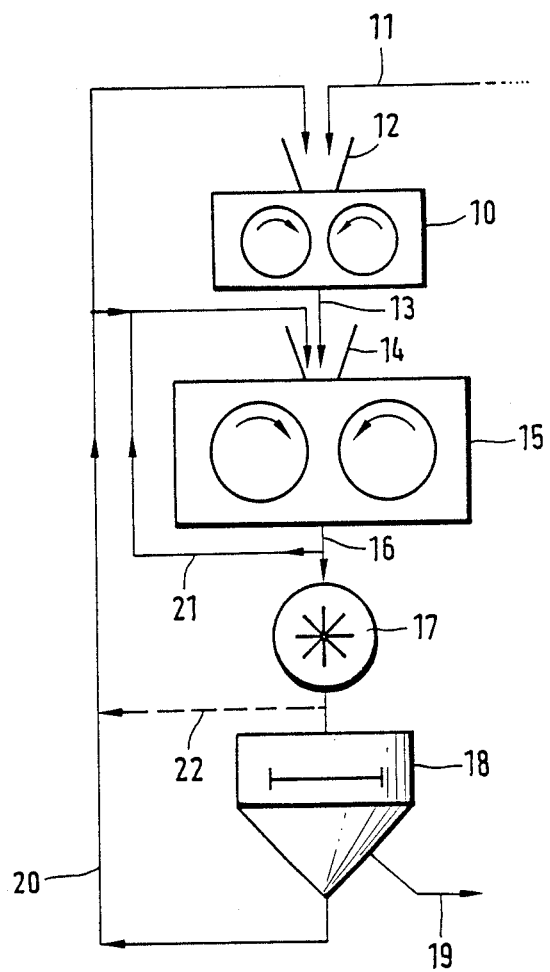

METHOD AND INSTALLATION FOR A CONTINUOUS PRESSURE COMMUNUTION OF BRITTLE GRINDING STOCK

BACKGROUND OF THE INVENTION

The invention relates to a method and apparatus for the continuous pressure comminution of brittle grinding stock such as cement clinker, ore, coal or the like.

More particularly, the method relates to stock preparation using a high-pressure roller press in which in the narrowest nip the grinding stock is subjected to a product bed comminution. The comminuted, pressed stock is de-agglomerated, and the adequately fine finished product is sorted from the de-agglomerated stock in a sifter. The coarse fraction (grit) is recirculated for redelivery to the roller press.

Considerable efforts have been made recently to increase the low energy exploitation in comminution and grinding systems, particularly those comprising tube mills or ball mills. A method for the comminution and grinding of brittle grinding stock has been disclosed in European Patent No. 0 084 383, for example in FIG. 2, wherein grinding stock, for example non-pre-comminuted cement clinker chunks, is pressed under high pressure in a first step in the nip of a high-pressure roller press. This leads to particle self-destruction, partly due to the creation of incipient cracks in the inside of the particles and being visibly expressed in the formation of agglomerates (what are referred to as scabs). These are then de-agglomerated or destroyed in the second step in a tube mill or ball mill which have a comparatively low energy outlay and can be ground to finished product fineness. This is because the grindability of the agglomerates produced by the pressing is considerably improved in comparison to unpressed material. In the region of the narrowest nip of the high-pressure roller press, the individual particles of the grinding stock are mutually crushed in a product bed, i.e., in a bulk material compressed between two surfaces. This is what is referred to as product bed comminution.

Product bed comminution is different and distinctive from mere roller pressing. In product bed comminution, the material to be crushed is supplied to the roller gap in a large quantity such that the product to be comminuted is drawn in between rollers and presses the rollers apart so that the particles of feed mutually crush one another in the roller gap to produce an agglomerated product bed. The gap width of the rollers resiliently pressed against each other greater than the particle size of the feed is maintained. Various arrangements have been attempted utilizing this unique process and operation and one form of utilization is referred to and described in U.S. Pat. No. 4,703,897, Beisner et al, issued Nov. 3, 1987.

U.S. Pat. No. 4,726,531, issued Feb. 23, 1988, Strasser, discloses a method and mechanism employing product bed comminution. As discussed therein, the charging stock to be comminuted is supplied to the nip of a press in a large quantity via a vertical stack arranged above the nip and the particles of charging stock mutually crush one another in the nip. The particles have internal incipient cracks. When the cement clinker is ground, it emerges from the nip comminuted and partially agglomerated to form scabs. The scabs are of such a nature that they can be crumbled by hand and thereafter broken up and deagglomerated, and a proportion of particles will have already been reduced to the desired fineness such as on the order of about 30% having a fineness of less than 90 μm.

Due to the high pressing power of the roller press upon destruction of the structure of the particles, for example, pressed granules of cement clinker, the agglomerates (scabs) that are formed constitute a certain proportion of particles that are already reduced to the desired cement fineness. This proportion that need not be further comminuted can burden the tube mill in the finished grinding of the agglomerates discharged from the roller press.

The energy exploitation or efficiency of tube mills or ball mills continues to be low and a roller press exhibits a lower specific energy consumption (kWh/t) in employment of product bed comminution in comparison to the ball mill. A method for comminution and grinding of brittle grinding stock such as the grinding of cement clinker to form cement is known (FIG. 4 of European Patent No. 0 084 383) wherein a tube mill or ball mill has been completely eliminated. The product pressed to form scabs in the nip of the roller press is thereby de-agglomerated and the finished cement is sorted out from the de-agglomerated product in a sifter, whereas the coarse fraction (grits) is recirculated for delivery to the roller press. When the adequately fine proportion of finished product contained in the pressed scabs of the roller press amounts to only 10% through 20%, then the grinding process must be operated with high circulation loads having a factor of up to more than 9. This means that, considered statistically, every particle of the product to be comminuted or, respectively, to be ground not only has to be scabbed about ten times but also has to be de-agglomerated, sifted and conveyed back to the roller press just as many times until it has arisen as finished product. The energy balance of the roller press itself that is initially very favorable is therefore diminished again because of frequent traversal of the product stream through the three sub-units of de-agglomerater, sifter and grits conveying means. This situation could be superficially improved in that a substream of the scabs obtained from the roller press is directly returned into the delivery shaft of this roller press. However, heterogeneous pressure distributions—what are referred to as pressure islands—then arise in the nip of the roller press due to the different densities of fresh charging stock (for example 1600 kg/m³) and scabs (for example, 2400 kg/m³), so that the scabs experience the highest—potentially excessively high—pressure in the nip due to their pre-pressure, whereas the fresh charging stock receives too little pressure due to its greater porosity and is therefore inadequately pressed. Even given this interconnection of the roller press, the scabs that proceed into the sifter can thereby still contain a relatively great quantity of coarse product, as a result whereof the product circulation load must continue to be high. The surfaces of the roller jackets, moreover, can be over-stressed due to the formation of pressure islands in the nip.

An object of the invention is to develop and improve a comminution method employing a high-pressure roller press but without employing a following ball mill such that it is possible to grind cement clinker into finished cement with a high degree of comminution in an economical fashion.

It is a further object of the invention to provide an improved apparatus and method for comminuting brittle stock such as cement clinker utilizing the principles of product bed comminution and which have a reduced energy consumption decreasing the cost of production and reducing the cost of machinery installation.

It is also an object of the invention to provide an improved comminution installation utilizing the principles of the method.

FEATURES OF THE INVENTION

In the comminution and grinding method of the invention, at least two high-pressure roller presses are connected following one another utilizing product bed comminution. The pressed material (scabs) of the first roller press is pressed at least a second time immediately thereafter in the nip of at least one further roller press. Every particle of the fresh charging stock is pressed at least twice. Expressed in other terms, after departing the nip of the second roller press, every product particle has been pressed at least twice before the pressed material is de-agglomerated in the de-agglomerater. As a result thereof, the following sifter is offered an even finer charging material and the grits returned from the sifter to the first and/or second roller press can be considerably reduced, as a result whereof the specific overall energy consumption is noticeably lowered.

In comparison to limestone, cement clinker must be pressed at extremely high pressures in the nip of the roller press. Given a prescribed pressing power of the rollers of the roller press, the effective comminution pressure in the nip is all the higher with the lower the porosity of the material to be pressed. This is because the pressure pattern in the nip becomes narrower in circumferential direction of the roller but becomes higher in amplitude. Given the respectively same pressing power of the rollers, the product in the nip of the second roller press can be pressed with a higher, maximum pressure than in the nip of the first roller press. Due to their pre-compression and, thus, due to their lower porosity, the scabs from the first roller press can thus be pressed at extremely high pressures in the nip of the second roller press in the energetically favorable range.

A special attribute of the roller press is that the thickness of the scabs from the second roller press is greater than the thickness of the scabs from the first roller press. Given constant circumferential speed of the rollers, this means that the throughput of the second roller press is also correspondingly higher. This opens up the possibility that a sub-stream of the pressed product (scabs) departing the second roller press can be recirculated into the delivery shaft of the second roller press as a circulation load. The disadvantage of forming pressure islands is thus eliminated at the second roller press, as would necessarily be the case given employment of only one roller press. As a result of this adjustment, both roller presses can be optimally loaded and the dimensioning is uncritical. Due to the direct return of a variable proportion of the pressed discharge of the second roller press back into the delivery of this second roller press, this can be operated at its maximum throughput power even given changing draw-in conditions (for example, moisture) and its design thus also becomes uncritical Since, in accord with the invention, all charging stock is pressed at least twice, a finer product is offered to the sifter in comparison to circulations having only a single roller press. The sifter receives an even finer and finer product with increasing size of the second roller press in comparison to the first roller press. As a result thereof, the product fineness can be controlled from the very outset in certain limits, i.e., taking economical aspects into consideration. By increasing the internal scabs circulation over the second roller press, namely, the offering of fine product in the following sifter is elevated again. This reduces the grits proportion and, thus, the grits circulation back to the first and/or second roller press. As a result thereof, the de-agglomerater, the sifter and the grits conveying means can be designed considerably smaller and, accordingly, use even less energy attaining better overall efficiency than is the case in the earlier referred to comminution method having only a single roller press. In practice, the second roller press will be dimensioned of such size that the sifter optimized in terms of design and operation receives a charging stock having an adequate proportion of finest material in order to be able to separate the required grain size distribution as finished product.

Other objects, advantages and features will become more apparent with the teaching of the principles of the invention in connection with the disclosure of the preferred embodiments thereof in the specification, claims and drawings, in which:

DESCRIPTION OF THE DRAWING

FIG. 1, which is the sole FIGURE of the drawing, is a somewhat schematic illustration of processing equipment constructed and operating in accordance with the principles of the invention.

DESCRIPTION

The drawing schematically shows the method of the invention as well as the apparatus of the invention for the comminution and grinding of brittle grinding stock together with the flow sheet of the product streams. The first stage of the comminution and grinding is composed of a high-pressure roller press 10 to which the charging stock 11 to be comminuted is delivered. The stock is a non-pre-comminuted cement clinker having a grain size up to, for example, 100 mm, and is delivered via a charging shaft 12. The grain size of a significant part of the charging stock 11 is larger than the width of the narrowest nip (for example, 20 mm) between the two pressing rollers that, for example, can have a diameter of 900 mm. The pressing power of the rollers of the roller press 10 pressing on the product amounts to more than 2 MN/m of roller length, for example 6 through 9 MN/m. (Mega-Newton per meter roller length. Conversion: 200 t/m=2.000 kN/m=2 MN/m).

The charging stock 11 is comminuted in the nip between the rollers on the basis of a combined single-grain comminution and product bed comminution. For implementing this latter principle of comminution, the charging stock to be comminuted is supplied to the nip of the press 10 in such a great quantity via the charging shaft 12 arranged above the roller nip that the material to be comminuted and drawn-in between the rollers presses the rollers apart. The particles of the charging stock mutually crush one another in the nip in a bulk fill or in a product bed. The cement clinker emerges from the nip comminuted and partially agglomerated, i.e., pressed to form scabs 13 whose proportion of particles already reduced to the desired cement fineness (usually about 25% smaller than 90 $\mu$m) which is already relatively high. The density of the grinding stock 11 amounts to about 1600 kg/m$^3$, and the density of the pressed scabs 13 amounts to about 2400 kg/m$^3$.

In accord with the invention, the scabs 13 of the roller press 10 are immediately directed into the charging shaft 14 of a second high-pressure roller press 15 in whose nip the product is pressed a second time.

The pressed product of the second roller press 15, namely the scabs 16, are de-agglomerated in a de-agglomerater 17, i.e., are disintegrated therein. They are conducted in this form to a sifter 18 that classifies the adequately fine finished product (19; cement) out of the de-agglomerated product. The coarse fraction 20 (grits) leaving the sifter 18 is recirculated into the charging shaft 12 of the first roller press 10 and/or into the charging shaft 14 of the second roller press 15.

Since the scabs 13 have been pre-compressed in the first roller press 10 and thus exhibit a low porosity, they can be pressed with all the higher maximum compression given the same pressing power in the nip of the second roller press 15. The thickness of the scabs 16 from the second roller press 15 is greater than the thickness of the scabs 13 from the first roller press 10. This means that, given the same circumferential roller speed, the throughput power of the second roller press 15 is greater than that of the first roller press 10. This opens up the possibility of re-supplying a sub-stream 21 of the discharge of the scabs 16 of the second roller press 15 to the charging shaft 14 of this roller press as a recirculating load. The disadvantage of the formation of pressure islands that was initially set forth and occurs given employment of only one roller press is eliminated.

The first roller press 10 presses a uniform charging stock 11 and, under given conditions 20, having high porosity and the roller press 15 presses a uniform charging stock 13, 21 and, under given conditions, 20, having low porosity. An overload due to pressure peaks is not possible in either roller press. Both roller presses are optimally loaded and the dimensioning is absolutely uncritical.

In a particularly advantageous way, the second roller press 15 is dimensioned larger than the first roller press 10 so that the internal scabs circulation 21 through the second roller press 15 can be increased. This has the advantage that the offering of fine material to the following sifter 18 is increased. This reduces the proportion of grits and, thus, the grits circulation 20 back to the first and/or second roller press. The three sub-units such as return product conveyor, sifter 18 and de-agglomerater 17 thus become significantly smaller and they therefore also use considerably less energy per ton of finished product, whereby the specific energy consumption (kWh/t) of the overall system is further reduced. If the grain size distribution of the finished product 19 does not absolutely correspond to the rated values due, for example, to excessively low fines, then a sub-stream 22 of the product that has been de-agglomerated but not yet sifted can be recirculated into the charging shaft 12 of the first and/or of the second roller press.

In order to particularize the pressure comminution of the invention, cement clinker was pressed in the nip of a high-pressure roller press. The pressed scabs that arose from the cement clinker were then input again to a roller press without de-agglomeration. In view of producing fine product and of saving grinding energy, the second press feed-through thereby led to a noticeable, in part even disproportionate benefit, as documented by the following test results:

(a) Grindability tests according to Zeisel given a fineness of 3000 cm$^2$/g measured according to Blaine:

Cement clinker, unpressed 23.3 kWh/t
    Cement clinker, pressed once 19.6 kWh/t
    Cement clinker, pressed twice 15.0 kWh/t
    I.e., the saving of specific grinding energy amounted to 3.7 kWh/t (=16%) after the first pressing; the second pressing yielded a saving of 4.6 KWh/t (=23%) by itself.

(b) Grindability tests according to Zeisel given a fineness of 4000 cm$^2$/g measured according to Blaine:

Cement clinker, unpressed 37.0 kWh/t
    Cement clinker, pressed once 33.0 kWh/t
    Cement clinker, pressed twice 27.4 kWh/t
    I.e., the saving of specific grinding energy after the first pressing amounted to 4.0 KWh/t (=11%); the second pressing yielded a saving of 5.6 kWh/t (=17%) by itself.

(c) Sieve feed-through in mass-percent given 32 $\mu$m 63 $\mu$m 90 $\mu$m

Cement clinker, pressed once 13.4, 19.9, 24.3
    Cement clinker, pressed twice 25.1, 27.5, 44.1
    In the second press feed-through, the re-formation of fine product (less than 32 $\mu$m) amounted to 87% with reference to the first press feed-through.
    Due to the higher settled apparent density of the charging stock, the scab thickness following the second press feedthrough was higher by a factor of 1.5 than following the first press feed-through.

These test results are valid for a specific grade of cement clinker and may be even more favorable for other grades of cement clinker.

The pressure comminution of the invention with application of at least two series-connected high-pressure roller presses makes it possible to manufacture, for example, finished cement, given minimum energy consumption without having to utilize a tube mill or a ball mill as a fine comminution machine and without having to accept high circulating loads of the overall system that are no longer economically justifiable.

We claim as our invention:

1. A method for the continuous pressure comminution of brittle grinding stock such as cement clinker, ore, coal of the like using a high-pressure roller in whose narrowest nip the grinding stock is subjected to a product bed comminution, the comminuted product is de-agglomerated, the fine finished product is classified out of the de-agglomerated product in a sifter, and the coarse fraction is recirculated for delivery into the roller press, characterized in that the agglomerates delivered from the roller press are pressed at least a second time in the nip of a further roller press before de-agglomeration so that the pressure pattern in the second roller nip becomes narrower in the circumferential direction but higher in amplitude.

2. A method according to the steps of claim 1, characterized in that the pressure of the second roller press acting on the grinding stock amounts to more than two MN/m of roller length, and the product is pressed with a higher maximum pressure in the nip of the second roller press than in the nip of the first roller press so that the agglomerations from the second press are thicker than from the first press.

3. A method according to the steps of claim 1, characterized in that a sub-stream of the pressed product leaving the second roller press is recirculated into the entry of the second roller press.

4. A method according to the steps of claim 1, characterized in that the output of the second roller press is sifted and the coarse fraction leaving the sifter is recirculated into the first roller press and the second roller press.

5. A method for the continuous pressure comminution of brittle grinding stock comprising the steps:
   passing the stock through a first high pressure roller and subjecting the material to product bed comminution;
   passing the output of the first high pressure roller to a second high pressure roller and subjecting the stock to product bed comminution in the second high pressure roller; and
   separating the coarse fraction from the second high pressure roller and recirculating said coarse fraction back to the input of the second high pressure roller.

6. A method for the continuous pressure comminution of brittle grinding stock in accordance with the steps of claim 5 including:
   de-agglomerating agglomerated scabs received from the second high pressure roller press.

7. A method for the continuous pressure comminution of brittle grinding stock in accordance with the steps of claim 6 including:
   separating the material after de-agglomeration and recirculating coarse fractions back to the second high pressure roller press.

8. A method for the continuous pressure comminution of brittle grinding stock in accordance with the steps of claim 6 wherein:
   the coarse grinding fraction which is separated is recirculated to both the first and second high pressure roller press.

9. A method for the continuous pressure comminution of brittle grinding stock in accordance with the steps of claim 5 wherein:
   the second high pressure roller press is chosen of a larger size than the first high pressure roller press.

10. A method for the continuous pressure comminution of brittle grinding stock in accordance with the steps of claim 5 wherein:
    the pressing power of the rollers in the second roller press is in the range of 6 to 9 MN/m.

11. A mechanism for continuous pressure comminution of brittle grinding stock comprising in combination:
    a high-pressure roller press;
    a de-agglomerater;
    a sifter positioned to receive material from the de-agglomerater; and
    a second roller press located between the roller press and the de-agglomerater.

12. A mechanism for continuous pressure comminution of brittle grinding stock constructed in accordance with claim 11 wherein:
    the second roller press has a product charging stack arranged immediately under a product discharge of the first roller press.

13. A mechanism for continuous pressure comminution of brittle grinding stock constructed in accordance with claim 11 wherein:
    substream means for leading off a substream of discharge agglomerates in a discharge of the second roller press and located ahead of the de-agglomerater; and
    a product recirculation line connected to deliver said substream of discharge agglomerates to a charging shaft of the second roller press and connected to receive products from said substream means.

14. A mechanism for continuous pressure comminution brittle grinding stock constructed in accordance with claim 11 wherein:
    the second roller press has a pressing capacity in the range of 6 through 9 MN/m.

15. A mechanism for continuous pressure comminution of brittle grinding stock comprising in combination:
    a first high pressure roller press;
    a second high pressure roller press connected to receive the discharge of the first high pressure roller press;
    means for delivering a brittle grinding stock to the first roller press with the roller press having a nip width narrower than the size of the precomminuted material delivered to the first press;
    a de-agglomerater connected to receive pressed stock from the second roller press;
    recirculation means connected from a discharge of the second roller press and leading to the input of the second press for recirculating coarse material;
    a de-agglomerater connected to the discharge of the second press for de-agglomerating scabs formed in the second press; and
    a sifter connected to the de-agglomerater and receiving material therefrom with lines arranged to feed back coarse material to at least one of said first and second roller presses 16. A mechanism for continuous pressure comminution of brittle grinding stock constructed in accordance with claim 15 wherein:
    said second roller press is of a larger capacity than said first roller press.

17. A mechanism for continuous pressure comminution of brittle grinding stock constructed in accordance with claim 15 wherein:
    said second roller press has a pressing capacity greater than 2 MN/m of roller length.

* * * * *